United States Patent Office 3,384,612
Patented May 21, 1968

3,384,612
GOLF BALL
Harry W. Brandt and Warren F. Busse, Wilmington, Del., assignors to E. I. du Pont de Nemours and Company, Wilmington, Del., a corporation of Delaware
No Drawing. Filed Feb. 1, 1966, Ser. No. 523,872
8 Claims. (Cl. 260—41)

ABSTRACT OF THE DISCLOSURE

A golf ball of a one-piece construction of a homogeneous solid can be prepared by a process that comprises blending from 25–75% by weight of an elastomer and complementally from 75–25% by weight of an ionic copolymer derived from an alpha-olefin of the formula $RCH=CH_2$ wherein R is H or alkyl having from 1–8 carbon atoms and from 1–25 mole percent of units derived from an $\alpha,\beta$-ethylenically unsaturated carboxylic acid and optionally a filler material for adjusting the weight of the ball.

---

This invention relates to a novel golf ball.

The golf ball of this invention resembles conventional golf balls in appearance, viz., size, shape and surface dimpling. The structure and materials of construction, however, are markedly different from conventional golf balls. Instead of the composite structure of the latter, namely, a thread wound core and separately molded cover, the golf ball of the present invention is of a unitary or one-piece construction of a homogenous solid, i.e., there is no separate core and cover, but instead, the surface of the ball is molded with the interior of the ball so as to be an integral part of said interior.

The solid material of and from which the golf ball of the present invention is made comprises a blend of from 25 to 75% by weight of an elastomer and, complementally, 75 to 25% by weight of an ionic copolymer prepared by neutralizing with metal ions at least 30% of the acid groups of a copolymer of units derived from an $\alpha$-olefin of the formula $RCH=CH_2$ wherein R is H or alkyl having from 1 to 8 carbon atoms and from 1.0 to 25 mole percent of units derived from an $\alpha,\beta$-ethylenically unsaturated carboxylic acid and optionally, as an intimate mixture with said blend, a filler material for adjusting the weight of the ball.

The golf ball of this invention can be made by blending together the elastomer, ionic copolymer, and filler components into a uniform mixture such as by melt blending in conventional equipment such as a rubber mill or Banbury mixer extruder, or the like. Alternatively, the components can be dry mixed together followed by melt fabrication of the dry mixture, by extrusion or injection molding. In the case of injection molding of dry mixtures, screw preplastication or other method of giving good mixing should be employed. Golf balls are made by injection molding of the mixture of the components into a suitably dimpled mold to give the golf ball of one-piece construction in virtually a one-step process which afterwards only requires a small amount of trimming of the sprue. Alternatively, the mixture of components can be injection molded into smooth spherical balls and then the dimples can be added by a separate conventional compression molding step.

The golf balls of this invention have all the qualities desired in a golf ball. The balls are sufficiently resilient and hard, to give the desired degree of bounce and feel as well as sound to the golfer upon impact of the golf-club head with the ball. The golf balls of this invention have advantages of being more economically made than those in present usage, this economy resulting from the one-step molding process. The golf balls have the additional advantage of being more durable in use than those presently used. This advantage stems from the high toughness of the elastomer/copolymer blend making-up the ball, which high toughness coupled with the fact that the ball is a homogeneous solid, i.e., has no separate cover, makes the ball virtually cut-proof.

The elastomer component of the golf ball of this invention can generally be described as any substance which, when cured, can be stretched at room temperature to at least twice its original length and, after having been stretched and the stress removed, returns with force to less than 1.5 times its original length in less than one minute. Examples of elastomers include natural rubber and synthetic rubbers such as the ethylene/proylene copolymers, SBR (butadiene/styrene copolymer) polyisobutylene, polybutadiene, polyisoprene, butyl rubber, chloroprene polymers and copolymers commonly known as neoprene, nitrile rubber (butadiene/acrylonitrile copolymers), and butadiene/styrene or acrylonitrile/methacrylic acid copolymers. The ethylene/propylene copolymers can consist solely of ethylene and propylene or can contain additional comonomers as do the copolymers described in U.S. Pat. Nos. 2,933,480 to Gresham, 3,093,620 to Gladding and Robinson, 3,093,621 to Gladding, and 3,000,866 to Tarney. In the copolymers described in these patents, a small amount of copolymer units derived from a third monomer are present for the purpose of supplying sulfur curability to the saturated hydrocarbon chain of the copolymer. It should be noted, however, that in the present invention, the elastomer component need not be cured. Optionally, the elastomer component can be cured to adjust the properties, such as hardness and bounce, of the finished golf ball. Curing can be accomplished by methods well known in the art, such as incorporating curing agents into the elastomer prior to blending, molding the blend into the golf ball, and thereafter, heating the ball to cure the elastomer, or by exposing the ball, which contains no curing agent, to $S_2Cl_2$ vapors, to cure the sulfur-curable elastomers at the surface of the ball. When low resilience rubber, such as butyl rubber, is used as the elastomer component, the resultant blend will also have correspondingly low resilience.

The ionic copolymer component of the golf ball of this invention is made by copolymerizing the $\alpha$-olefin and carboxylic acid, described hereinbefore, preferably but not necessarily following the procedure of Brit. Pat. No. 963,380 to give a random distribution of the acid groups in the copolymer chain. The ionic copolymers of the Examples herein are random copolymers. The ionic copolymer acts in the solid state as if it were cross-linked and in the molten state as if it were not cross-linked. The resultant acid copolymer by itself or after blending (but before molding) with the elastomer is then initimately contacted with a basic compound containing the particular metal ion desired, to obtain the amount of neutralization desired. The preferred range of neutralization is from 30 to 100% by wt. of the acid groups present. "Neutralization" and variations of this word mean reacting the metal ion with the acid groups of the copolymer to obtain the ionic copolymer. Useful metal ions include those having a valence of 1 to 3 inclusive and particularly those of Groups I (*a* and *b*) and II (*a* and *b*) and the transition elements of the Periodic Table. Because of the possibility of polyvalent metal ions forming basic salts, as much as 150% of the amount of such metal ion theoretically needed for 100% neutralization can be used. The ionic copolymers and their preparation are described in greater detail in Can. Pat. Nos. 674,595 and 713,631 both to Rees. The preferred mole percent of mono- or dicarboxylic acid derived units is from 3 to 15 mole percent. Examples of olefins include ethylene, propylene, butene-1, and hexene-1. Examples of acids include acrylic, methacrylic acids and maleic and fumaric acids and monoalkyl esters and anhydrides thereof.

Preferred blends for molding the golf ball of this invention are 35 to 65% by weight of elastomer and complementally, 65 to 35% of ionic copolymer, and more narrowly, 45 to 55% of each component to total 100%. The properties of presently available golf balls generally vary with price. The exact elastomer/ionic copolymer composition selected for making the golf balls of the present invention will depend on the properties desired in the final product. In other words, the golf balls of this invention can be made to have the playing characteristics found either in the more expensive golf balls or in the less expensive golf balls. For example, high quality golf balls have a rebound of from about 40 to 44" when dropped onto a surface of relatively high mass and inertia from a height of 60", whereas balls selling for a lower price may have a rebound height of only 25–30". To change the rebound height of golf balls of this invention, while maintaining other characteristics acceptable, either more elastomer or elestomer having a low resilience can be used in the molding composition. In addition, the rebound can be changed, i.e., increased, by the degree of cure, if any, of the elastomer component of the ball.

Golf balls made from molding compositions containing only elastomer and ionic copolymer may be several grams under the maximum permitted weight of 45.9 grams for the standard golf ball. To increase the weight of the golf ball of this invention, fillers having a relatively high density can be added to the composition during the step in which the elastomer and ionic copolymer components are blended. Such fillers include $TiO_2$, pyrites, whiting, $BaSO_4$, clay $PbSO_4$, PbO, $MgCO_3$, basic lead carbonates or silicates, $SnO_2$, chromates, and iron oxides. Fillers such as $TiO_2$ increase the whiteness of the golf ball. Fillers such as $PbCO_3$, $CaCO_3$, and PbO can react with the acid groups of the ionic copolymer during mixing to increase the hardness of the ball. The amount of filler required will depend on the density of the particular filler employed and on the amount of weight to be added to the golf ball. Generally, no greater than 30% by wt. of the blend of filler would be used.

The golf ball can be painted, if desired, to increase its whiteness, by first brushing the ball with toluene, evaporating the toluene, and then applying a standard golf ball paint such as Wittek Golf Ball Enamel. An overcoat of urethane paint such as sold by the Chemical Coatings Corp., viz., GL White Synthetic Paint, can then be applied to give the whiteness long life.

In the foiolwing examples, parts and percents are by weight unless otherwise indicated. The cut resistance of the golf balls of this invention was measured (guillotine test) by nothing the effect of impact of a knife edge backed-up by a weight of 1583 grams and falling about 30" onto a golf ball ⅜" off its center. The rebound height of the golf ball was determined by dropping the ball from a height of 60" onto an iron plate 6" x 12" x 1" with a smooth rebound surface. The sound or "click" of the golf ball in the rebound test was compared with that of a high quality commercially available golf ball selling for $1.25 per ball and assigned the following symbols: +++, extremely harsh sound; ++, considerably harsher than the commerically available golf ball used as a standard; +, somewhat harsher; ± about the same as the golf ball used as a standard; —, softer than the golf ball used as a standard. Tensile properties were determined on sheets 1/16" thick of the blend molded at 180° C. The durometer hardness (D Scale, 30 sec. penetration) and scleroscope resilience were measured on a stack of four thicknesses of chips cut from ⅛" thick sheets. The elastomers do not contain any curing agents unless otherwise specified.

Example I

Blends of varying proportions of elastomer and ionic copolymer were made and subjected to the tests just described. Test results are reported in Table I. The elastomer used was an uncured copolymer of having 63 mole percent of its units derived from ethylene, 35.3 mole percent of its units derived from propylene, and 1.66 mole percent of its units derived from 1,4-hexadiene. The copolymer was made by copolymerizing these monomers in tetrachloroethylene in the presence of a coordination catalyst made by reacting diisobutyl aluminum monochloride with vanadium oxytrichloride. Details of the polymerization procedure and elastomer are described in U.S. Pat. No. 2,933,480. The elastomer had a Mooney Viscosity of 40 (ML–4/250° F.). The ionic copolymer was prepared by following the copolymerization procedure of Brit. Pat. No. 963,380 and by neutralizing the resultant copolymer with sodium ions according to the procedure of Can. Pat. No. 674,595. The copolymer contained 83% by wt. of units derived from ethylene and 17% by wt. of units derived from methacrylic acid, 57% of the acid units being neutralized with sodium ions. The melt index of the ionic copolymer before such neutralization was 84 and afterwards, 5.0. The elastomer and ionic copolymer components were mixed on a 6" rubber mill at 150° C. and the resultant blend was chopped into fine pieces and fed to a 2 oz. vertical injection molding machine operating at 180° C. to form articles for testing. Solid balls having a smooth surface were injection molded in this machine at 180° C. The balls were then dimpled in a standard golf ball dimpling compression mold heated to 120° C.

TABLE I

| Ionic Copolymer, Wt. Percent | Elastomer, Wt. Percent | Ball Rebound (inches) | "Click" | Durom. Hardness (D Scale) | Scleroscope Resilience | Tensile Properties | |
|---|---|---|---|---|---|---|---|
| | | | | | | Ultimate Strength, p.s.i. | Elong., Percent |
| 100 | | 43.5 | +++ | 69 | 75 | 4,980 | 325 |
| 75 | ¹ 25 | 39.5 | ++ | 42 | | | |
| 60 | 40 | 42.0 | + | 37 | 72 | 1,110 | 150 |
| 50 | 50 | 43.0 | ± | 28 | 69 | 800 | 120 |
| 40 | 60 | 42.5 | ± | 18 | 78 | 320 | 86 |

¹ Ethylene/propylene copolymer without the diene third monomer component.

The golf balls containing from 40 to 60% by wt. of the elastomer have good characteristics, with the 50–50 mixture giving the best golf ball. The ball having the click represented by +++ and the hardness of the 100% ionic copolymer feels like a stone when hit by a golf club and damages the club accordingly.

The golf ball gradually loses hardness as the amount of elastomer increases from 60% and the elastomer remains uncured, until at 100% elastomer, a rubber ball is obtained.

Example II

Blends of 50 parts by wt. of the ionic copolymer of Example I and 50 parts by wt. of various elastomers were prepared and golf balls made according to the procedure of Example I. Test results are reported in Table II. Elastomer (A) is the same copolymer of three monomers described in detail in Example I except that it has a Mooney Viscosity of 70 (ML-4/250° F.). Elastomer (B) has the same composition and viscosity as the elastomer of Example I. Elastomer (C) is a copolymer of styrene/butadiene commonly available as SBR 1052. Elastomer (D) is crepe rubber. Elastomer (E) is butyl rubber available as Enjay No. 365. Elastomer (F) is a carboxylated butadiene nitrile rubber available as "Hycar" 1042.

ionic copolymer and 20% $TiO_2$, only a thin, barely noticeable cut occurred in the ball. In a high quality ball costing $1.25, however the guillotine test caused a gash about 1¼" long and ⅛" wide, piercing the cover and exposing the windings of rubber thread.

By way of further example, golf balls of reasonable quality have been made by mixing together the latices of

TABLE II

| Elastomer | Ball Rebound (inches) | "Click" | Durom. Hardness (D Scale) | Scleroscope Resilience | Tensile Strength, p.s.i. | Ultimate Elongation, Percent |
|---|---|---|---|---|---|---|
| A | 42.5 | ± | 28 | 69 | 800 | 120 |
| B | 42.5 | ± to + | 25 | 68 | 380 | 40 |
| C | 39.5 | + | 25 | 66 | 420 | 30 |
| D | 40.0 | + to ± | 30 | 66 | 430 | 60 |
| E | 25.0 | ± | 25 | 50 | 390 | 50 |
| F | 39.0 | + to ± | 30 | 64 | 1,750 | 50 |

Example III

Blends of different ionic copolymers and the elastomer of three monomers described in Example I were prepared and golf balls made according to Example I. The ionic copolymers were copolymers of ethylene and methacrylic acid and were prepared according to the procedure set forth in Example I. Details of the compositions and test results are reported in Table III.

an ionic copolymer and an elastomer, the mixed latices then being cured, precipitated with acetone, dried, and injection molded into the golf ball shape. In the case of polychloroprene modified with diisopropyl xanthagen disulfide, the elastomer latex contained hexamethylene diamine for curing purposes, and the resultant molding composition consisted of 50% elastomer and 50% ionic copolymer.

TABLE III

| Ionic Copolymer | | | | Elastomer, wt. percent | Ball rebound (inches) | "Click" | Dur. Hard. D | Scleroscope Resilience | Tensile Strength | Ult. Elong. |
|---|---|---|---|---|---|---|---|---|---|---|
| Amt., wt. percent | Acid, wt. percent | Percent Neut. | Metal ion | | | | | | | |
| 50 | 17 | 57 | Na | 50 | 42.5 | ± | 28 | 69 | 800 | 120 |
| 60 | 11 | 58 | Na | 40 | 38.5 | + to ± | 32 | 73 | 1,090 | 220 |
| 50 | 11 | 58 | Na | 50 | 39.5 | + | 24 | 73 | | |
| 40 | 11 | 58 | Na | 60 | 40.0 | ± | 18 | 68±4 | 370 | 140 |
| 60 | 12 | ¹60 | Mg Zn | 40 | 40.0 | + to ± | 33 | 78 | 1,450 | 200 |
| 50 | 12 | ¹60 | Mg Zn | 50 | 40.0 | ± | 28 | 78 | 740 | 77 |
| 40 | 12 | ¹60 | Mg Zn | 60 | 40.5 | ± | 18 | 78 | 450 | 93 |
| 50 | 15 | 59 | Na | 50 | 42.5 | ± | 27 | 73 | 860 | 180 |
| 50 | 12 | 64 | Zn ² | 50 | 39.5 | ++ | 30 | 75±3 | | |

¹ 50% neutralized with Mg and 10% neutralized with Zn.
² Zn Chelated with tetramethylenetetramine.

Example IV

This example shows blends of ionic copolymers of ethylene and methacrylic acid with elastomers (A) and (B) of Example II and various fillers. The blends were prepared and golf balls were made according to Example I, with the filler being added to the blend while in a 6" rubber mill. Details of the compositions and test results are reported in Table IV. For the composition in which $PbCO_3$ is the filler, the starting copolymer of ethylene and methacrylic acid contains no neutralization but becomes neutralized by reaction with the $PbCO_3$ during compounding on the rubber mill as is evidenced by the increase from 25" to 42" in rebound height of the resultant golf ball.

As many apparently widely different embodiments of this invention may be made without departing from the spirit and scope thereof, it is to be understood that this invention is not limited to the specific embodiments thereof except as defined in the appended claims.

What is claimed is:

1. A golf ball of a blend of from 25–75% by weight of an elastomer selected from the class of elastomers consisting of natural rubber, ethylene/propylene copolymers, butadiene/styrene copolymer, polyisobutylene, polybutadiene, polyisoprene, butyl rubber, polychloroprene, chloroprene copolymers, butadiene/acrylonitrile copolymers, butadiene/styrene and acrylonitrile/methacrylate acid copolymers, and, complementally, from

TABLE IV

| Ionic Copolymer | | | | Elastomer | | Filler | | Rebound (inches) | "Click" | Sur. Hard. D | Scler. Res. | Tens. Str. | Ult. Elong. |
|---|---|---|---|---|---|---|---|---|---|---|---|---|---|
| Amt., wt. percent | Acid, wt. percent | Neut., percent | Metal ion | Amt., wt. percent | Type | Amt., percent | Kind | | | | | | |
| 54.8 | 17 | 57 | Na | 36.4 | (B) | 8.6 | Pb Powder | 41. | + | 35 | 71 | 950 | 90 |
| 50.6 | 17 | 57 | Na | 33.7 | (B) | 15.7 | Basic Pb silicate | 42.0 | + to ± | 38 | 74 | 1,320 | 80 |
| 54.0 | 17 | 57 | Na | 36.0 | (B) | 10.0 | PbO | 43.0 | + to ± | 32 | 78 | 800 | 40 |
| 51.2 | 17 | 57 | Na | 34.2 | (B) | 14.6 | $PbCO_3$ | 42.0 | + to ± | 38 | ~75 | 700 | 30 |
| 45.7 | 11 | 58 | Na | 45.7 | (A) | 8.6 | Pb | 41.0 | + to ± | 25 | 77±5 | 570 | 90 |
| 42.2 | 11 | 58 | Na | 42.2 | (A) | 15.0 | $PbSO_4$ | 39.5 | + to ± | 28 | 77 | 820 | 150 |
| 42.1 | 11 | 58 | Na | 42.1 | (A) | 15.6 | "White Lead" | ~43. | ± | 25 | 81 | 540 | 49 |
| 50.0 | 15 | 0 | | 50.0 | (A) | 0 | | 25.0 | | 16 | 44 | | |
| 40.0 | 15 | | | 40.0 | (A) | 20.0 | $PbCO_3$ | 42.0 | + to ± | 32 | 75±3 | | |
| 45.0 | 12 | 60 | Mg¹ Zn | 45.0 | (A) | 10.0 | PbO | 43.0 | ± | 32 | 76 | | |
| 40.0 | 17 | 57 | Na | 40.0 | (B) | 20.0 | $TiO_2$ | 40.0 | + to ± | 29 | 63 | 670 | 3 |
| 48.5 | 17 | 57 | Na | 48.5 | (A) | 3.0 | Ca stearate | 43.0 | + to ± | 28 | 74 | 810 | 100 |

¹ 50% neutralized with Mg and 10% neutralized with Zn.

Each of the gold balls of this example were subjected to the guillotine test previously described and in most cases, such as the blend of 40% of elastomer (B), 40%

25–75% by weight of an ionic copolymer made by neutralizing with metal ions at least 30% of the acid groups of a copolymer of units derived from an alpha-olefin of the formula $RCH=CH_2$ wherein R is H or alkyl having from 1–8 carbon atoms and from 1.0 to 25 mole percent of units derived from an $\alpha,\beta$-ethylenically unsaturated carboxylic acid selected from the class of $\alpha,\beta$-ethylenically unsaturated carboxylic acids consisting of acrylic acid, methacrylic acid, maleic acid, fumaric acid, monoalkyl maleate esters, monoalkyl fumarate esters, maleic anhydride and fumaric anhydride.

2. The golf ball of claim 1 painted.

3. The golf ball of claim 1 wherein said elastomer is a copolymer of ethylene/propylene.

4. The golf ball of claim 1 wherein said said $\alpha$-olefin is ethylene.

5. The golf ball of claim 1 wherein said carboxylic acid is methacrylic acid.

6. The golf ball of claim 1 wherein said blend contains no greater than 30% by weight of a solid, dense, uniformly distributed filler for adjusting the weight thereof.

7. The golf ball of claim 6 wherein said filler is $TiO_2$.

8. The golf ball of claim 6 wherein the elastomer is a copolymer of ethylene/propylene, the ionic copolymer is a copolymer derived from ethylene and methacrylic acid, and the filler is basic lead silicate.

References Cited

UNITED STATES PATENTS

| | | | |
|---|---|---|---|
| 3,264,272 | 8/1966 | Rees | 260—80.511 |
| 3,313,545 | 5/1967 | Bartsch | 260—41.5 |

MORRIS LIEBMAN, *Primary Examiner.*

S. L. FOX, *Assistant Examiner.*